United States Patent [19]
Elmer et al.

[11] 3,735,470
[45] May 29, 1973

[54] INDEXING TOOL TABLE

[75] Inventors: James W. Elmer, Osseo; Donald C. Reschke, Wayzata, both of Minn.

[73] Assignee: Inventors Engineering Inc., Minneapolis, Minn.

[22] Filed: July 19, 1971

[21] Appl. No.: 163,622

[52] U.S. Cl. .................................................29/208 F
[51] Int. Cl. ............................................B23p 19/04
[58] Field of Search.....................29/208 F, 208 R, 29/208 D, 211 R

[56] References Cited

UNITED STATES PATENTS 3,143,792   8/1964   Swanson..........................29/208 F Primary Examiner—Thomas H. Eager
Attorney—Ralph L. Dugger, Stuart R. Peterson, Clayton R. Johnson and Nicholas E. Westman

[57] ABSTRACT

An indexing tool table which has a tooling plate or dial which rotates about a substantially upright axis and which has indexing means thereon and also utilizes interlocking pin and receptacle means located adjacent the periphery of the dial to hold the dial stable during use. The interlocking pin and receptacle means forming the holding device are disengaged during the indexing operations.

20 Claims, 10 Drawing Figures

PATENTED MAY 29 1973

INVENTORS
JAMES W. ELMER
DONALD C. RESCHKE
BY
Dugger, Peterson, Johnson & Westman
ATTORNEYS

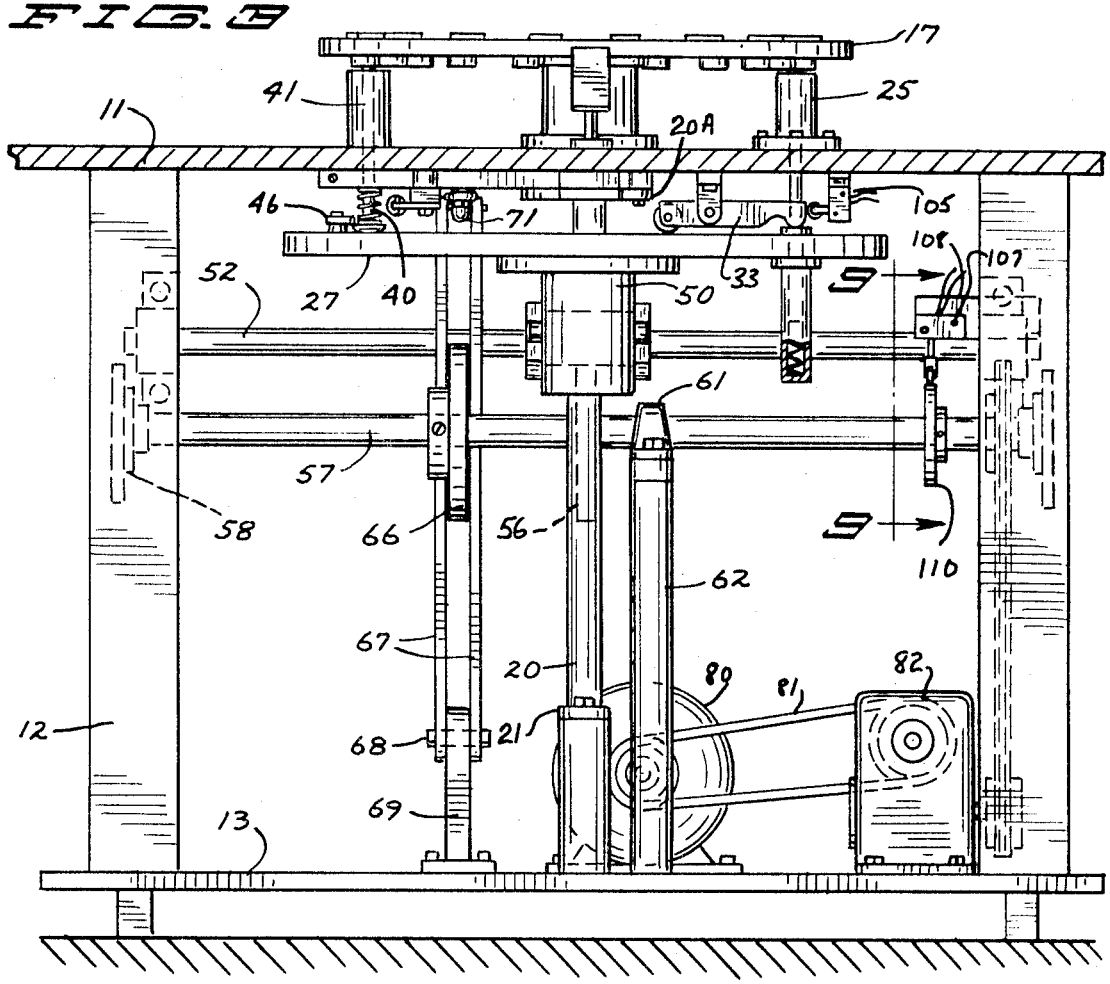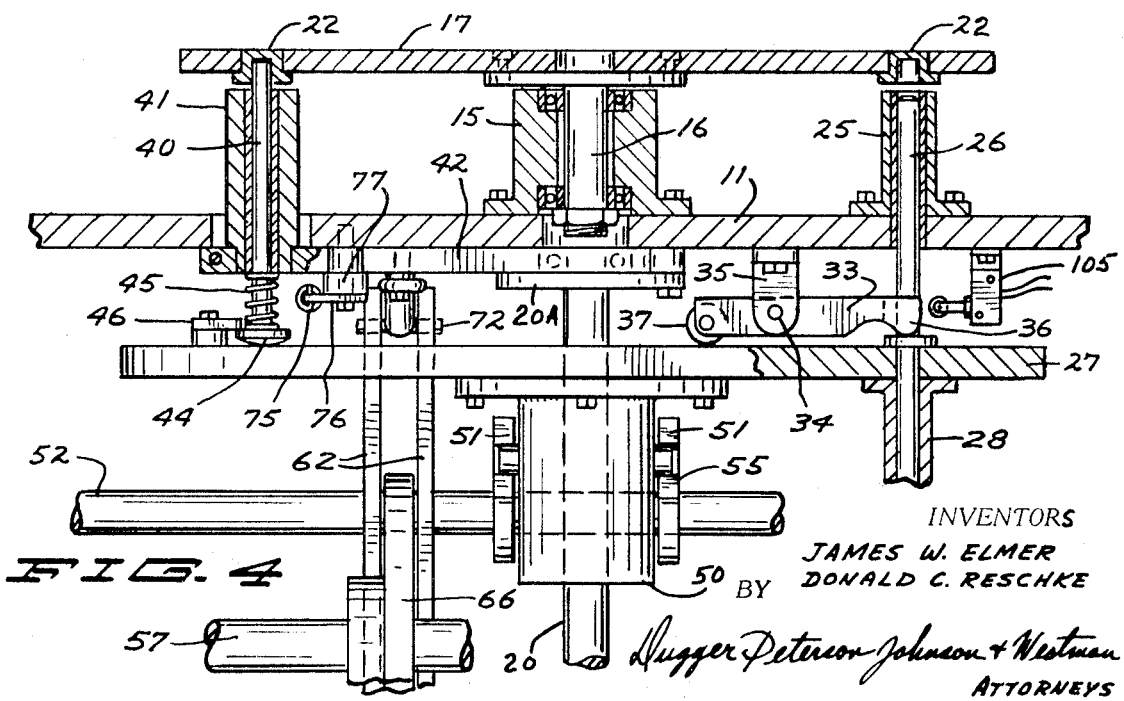

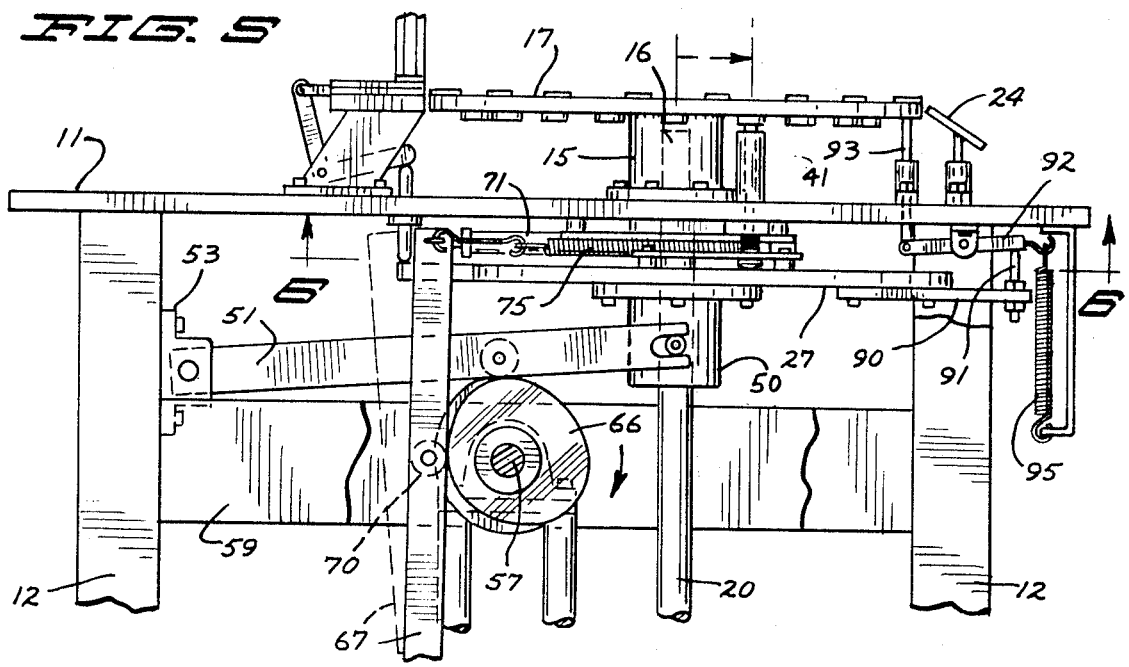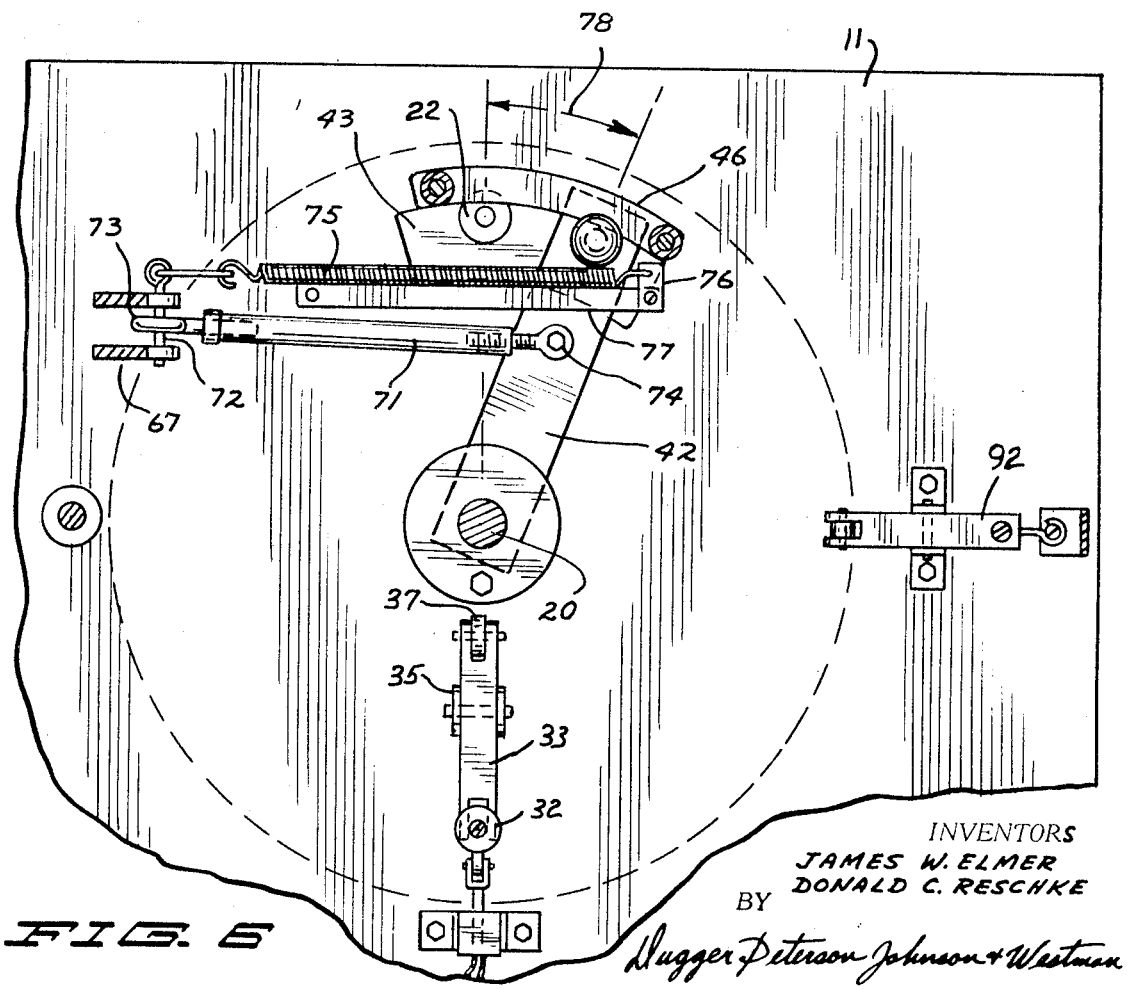

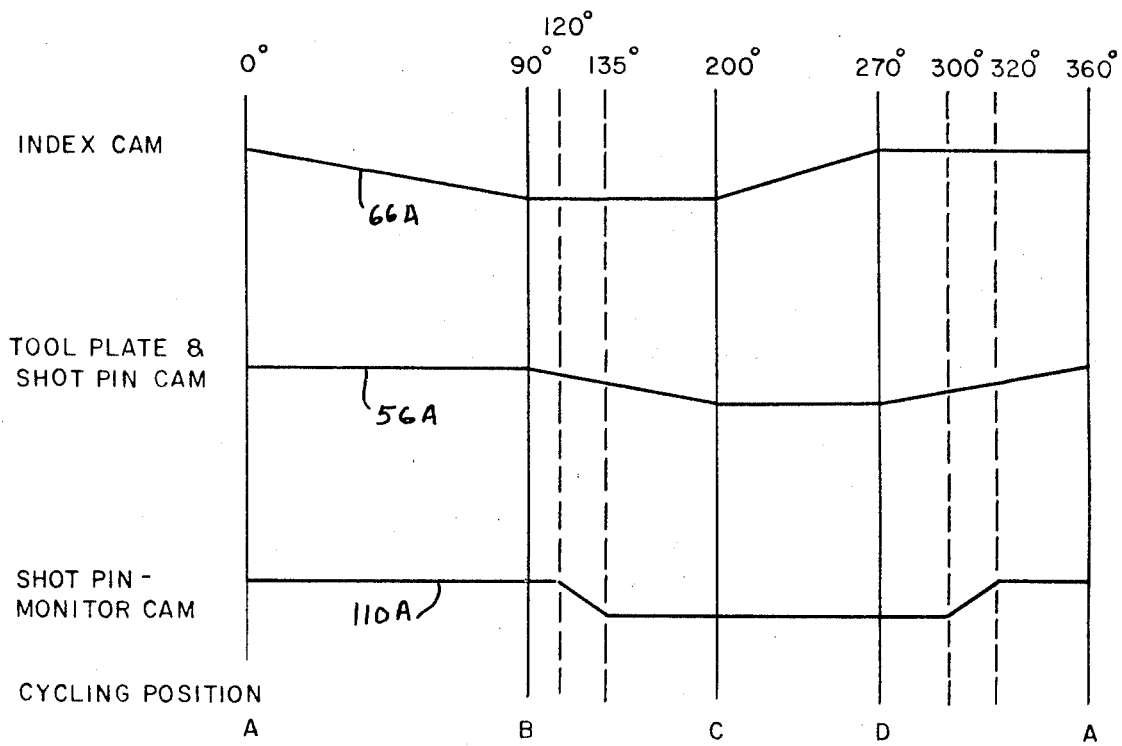
FIG. 10
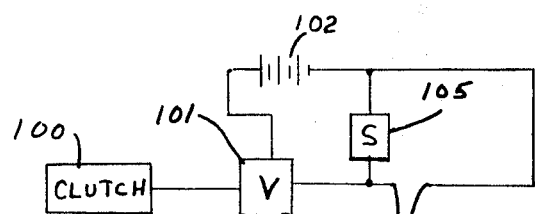
FIG. 9
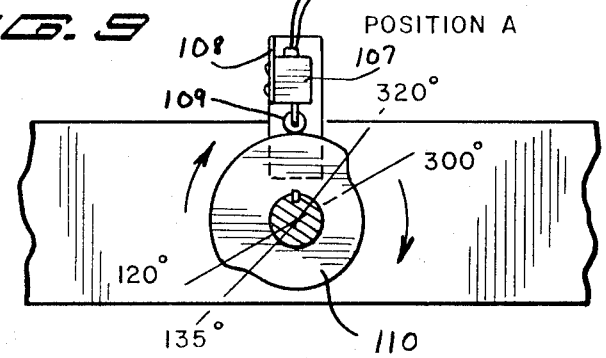

3,735,470

INDEXING TOOL TABLE

BACKGROUND OF THE INVENTION

1. Field of the Invention

The present invention relates to indexing type tool bases or tables.

2. Prior Art

Indexing dial tooling tables of various types have been known in the art. For example, on Page 82 of the Feb. 1967, issue of the magazine Automation, a diagram of various indexing mechanisms is shown. U.S. Pat. No. 1,923,440 utilizes a holding or shot pin near the periphery of a table used for indexing and tooling.

Another patent which shows a holding or shot pin on a work table that is positioned outwardly from the axis of movement of the table is U.S. Pat. No. 2,531,890.

All of the prior art tooling tables have problems with precision, power requirements, and ease of adapting to various tooling setups. Usually there are complex cams, pawls or gear drives necessary and the table tops generally are not held precisely in position.

SUMMARY OF THE INVENTION

The present invention relates to indexing tooling dials or tables. More particularly, the invention relates to a rotary indexing dial that can be used for automated work operations and can be indexed sequentially to advance work pieces to different work stations and which is precisely held in each indexed position. The indexing dial of the present invention comprises a plate rotatable about a generally upright axis, and which is indexed into a plurality of distinct positions to provide a number of stations for manufacturing operations around the periphery of the plate.

The dial plate is held positively in each of these positions with a "shot pin" which is a retractable stop pin that enters a receptacle in the dial itself to positively hold the dial from rotation at the end of each indexing cycle. The unit requires little power for operation, and the indexing mechanism utilizes a cam follower linkage system which retracts the shot pin prior to indexing. The indexing motion is under spring force for safe operation.

The mechanism is reliable, very easily manufactured, and permits a very compact indexing table assembly.

The timing of the unit is such that no damage to the structure is possible.

BRIEF DESCRIPTION OF THE DRAWINGS

FIG. 3 is a view taken as on line 3—3 in FIG. 2;

FIG. 4 is a fragmentary enlarged sectional view taken as on line 4—4 in FIG. 2;

FIG. 5 is a view taken in the same way as FIG. 2, but with the cams in a different position;

FIG. 6 is a sectional view taken as on line 6—6 in FIG. 5;

FIG. 7 is a view taken on the same line as FIG. 5 with the unit in still a different position from that shown in FIGS. 5 and 2;

FIG. 8 is a sectional view taken as on line 8—8 in FIG. 7;

FIG. 9 is a fragmentary sectional view taken as on line 9—9 in FIG. 3; and

FIG. 10 is a schematic representation of a timing diagram showing the sequence of operation of the device of the present invention.

DESCRIPTION OF THE PREFERRED EMBODIMENT

Figure 1:
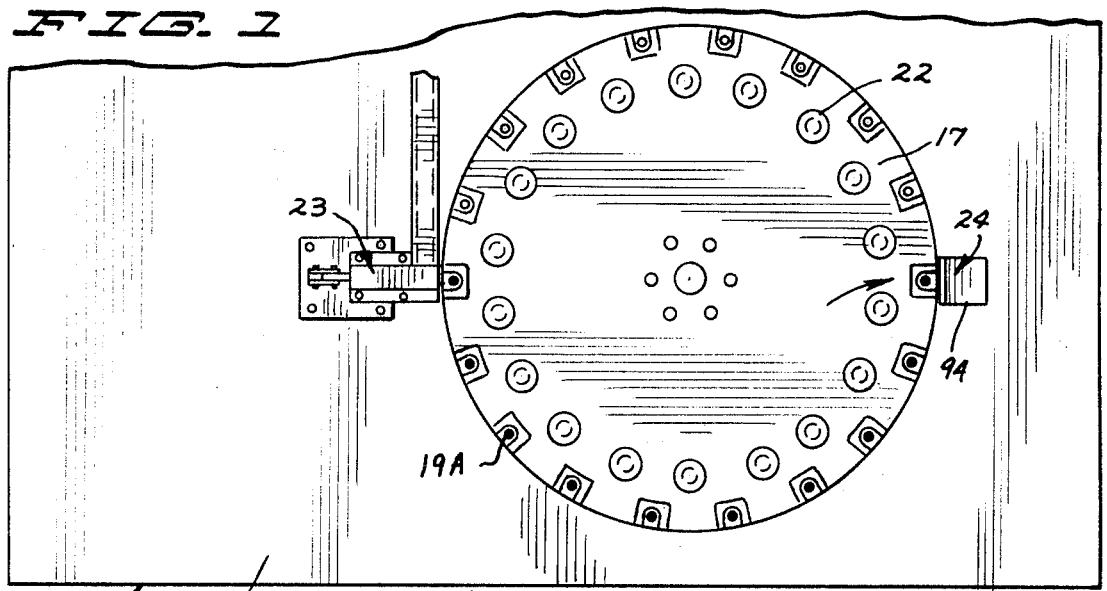
FIG. 1 is a top plan view of a rotary indexing dial made according to the present invention.

A rotary indexing dial table indicated generally at 10 comprises a main table top 11, that has support legs 12, and a bottom support plate 13 extending between the legs 12. The table rests on the floor 14 in a conventional manner. The support table top 11 has a hub 15 mounted on the top thereof, and the hub in turn rotatably mounts a shaft 16 (see FIG. 4) that is mounted in suitable bearings in the hub 15. The shaft 16 is attached to a rotating index plate or dial 17. The dial 17 thus rotates about an upright axis within the hub 15. The shaft 16 extends only down to the table top 11, and does not extend all the way through. Suitable fasteners hold the shaft 16 in the hub.

Coaxial with and below shaft 16 there is a second shaft 20 mounted with a suitable retainer 20A to the bottom side of the top of table 11, and the opposite end of shaft 20 is mounted in a support bracket 21 at the bottom part of the support table.

The rotating dial 17, as shown, is provided with a plurality of guide bushings 22 spaced evenly around the plate and positioned only a short distance inwardly from the periphery of the indexing dial. These guide bushings are used for holding the dial steady, and also for indexing the dial.

The dial 17 thus is divided up into a plurality of individual stations. The dial can be used for operations on an assembly line basis or the like, for example, a loading mechanism 23 can be mounted onto the table top 11, at a loading station and an unloading station 24 can be diametrically opposed. In between these two stations, there are eight processing stations showing work holders 19 in which items being worked on can be processed. The tooling for the work can be mounted on the table top adjacent the edge of the dial.

Movement of the indexing dial 17 about the axis of shaft 16 is controlled with a linkage mechanism that is mounted below the table top 11 and operates through the table top 11 to hold or to move the indexing dial.

Figures 7, 8:
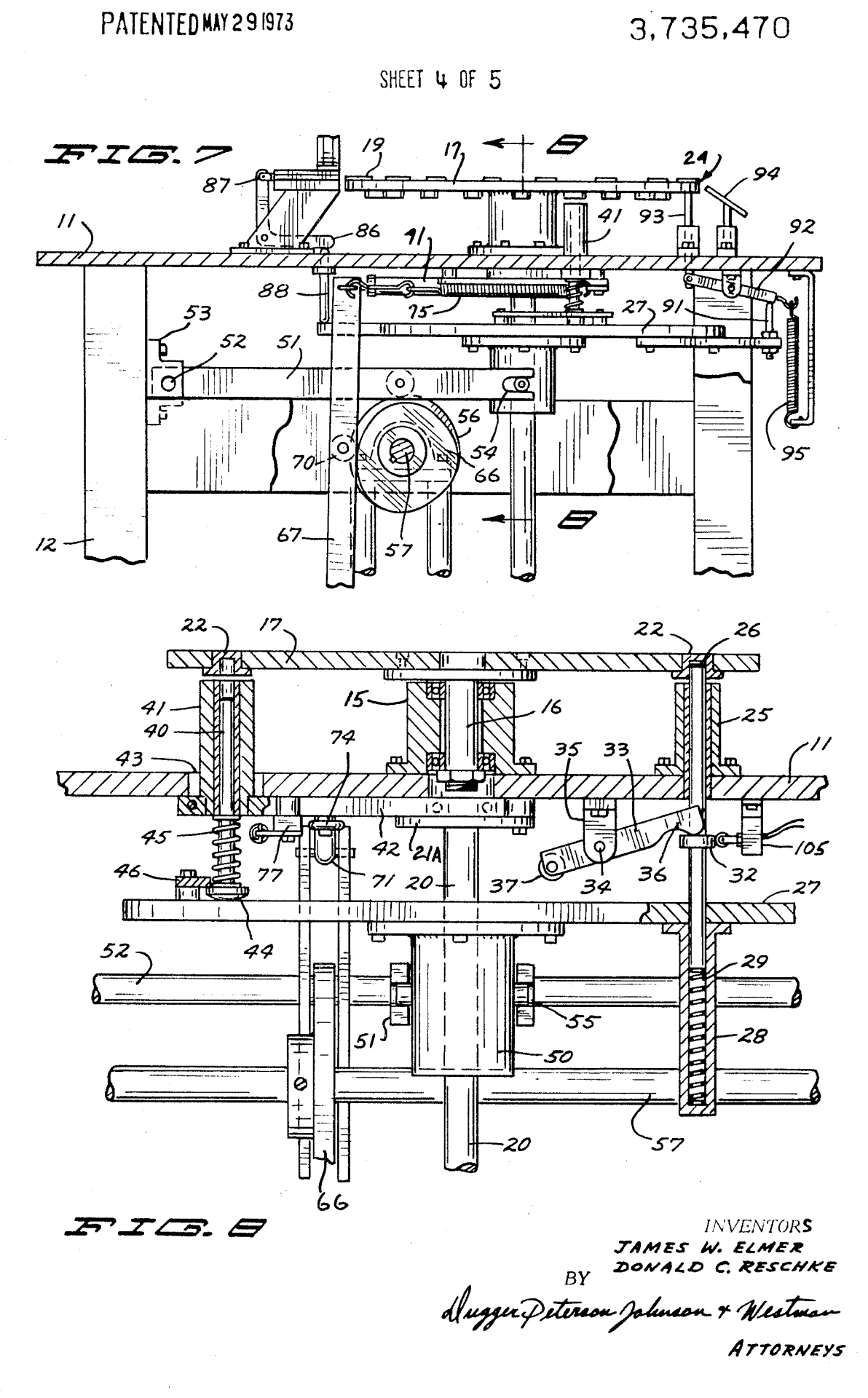

The retaining means for the indexing dial is perhaps most clearly shown in FIG. 8, wherein a sleeve 25 is mounted onto the table top 11, and houses a shot pin 26 that is slidably mounted in the hub 25 for movement along the axis of this pin. The pin extends through the table top 11 and also slidably passes through an actuator or tool plate 27 and enters a housing 28 that is attached to the actuator plate. The housing has an internal spring member 29 that acts against the end of the shot pin 26. The shot pin 26 has a collar 32 mounted thereon, and a lever 33 is pivotally mounted as at 34 to a bracket 35 fixed to the bottom surface of the table top 11. The lever 33 acts as a rocker arm having a bifurcated end portion 36 that engages the collar 32 on the shaft 26. The other end of the lever 33 has a roller 37 mounted thereon and this roller 37 is acted upon by the actuator plate 27 as will be explained later to pivot the lever 33 about its axis 34 and pull the shot pin 26 out of the bushing 22 with which it is aligned.

The pin which operates as an indexing pin 40 also operates in conjunction with the bushings 22, and the indexing pin 40 is slidably mounted in a hub 41 that in turn is attached to an arm 42 that is rotatably mounted to the shaft 20, and rotates about the axis of shaft 20. The arm 42 is positioned between the retainer 20A and the bottom surface of table top 11. The hub 41 extends through a slot 43 in the table top 11 and the hub extends to position adjacent the bottom side of the indexing dial 17. The pin 40 has a head 44 thereon and a spring 45 is positioned between the bottom of the hub 41 and the head 44 to urge the indexing pin away from the dial 17. The head 44 is rounded on its bottom surface and rides against the top surface of the actuator plate 27. In addition, a retainer rail 46 is proved on the actuator plate 27 which extends over one edge portion of the head 44 so that an edge portion of the head 44 is sandwiched or held between the top surface of the actuator plate 27 and the bottom of the clip 46 to insure that the pin 40 will move with the actuator plate in direction of the longitudinal axis of the pin 40.

The actuator plate 27, as shown, has a hub member 50 mounted thereon and the hub member 50 slidably receives the shaft 20 so that the hub can slide along the shaft 20 in axial direction of the shaft 20. The movement of the actuator plate in axial direction of the shaft 20 is controlled through a pair of arms 51 that are drivably mounted onto a shaft 52 that in turn is rotatably mounted in bearings 53 attached to the supports 12. The ends of the arms 51 opposite from the shaft 52 are provided with slots 54 that fit over ears or projections 55 on opposite sides of the hub 50, to slidably receive these projections.

A cam member 56 is mounted onto a cam shaft 57 that in turn is rotatably mounted in bearings 58 at opposite ends thereof. The bearings 58 are mounted on cross members 59. In addition, the cam shaft 57 is mounted in a center bearing 61 that is in turn attached to a pair of supports 62 that are fixed to the bottom plate 13. This is to give protection against excessive deflection of the cam shaft.

The cam 56 acts against a cam roller 63 that is rotatably mounted between the arms 51 and the weight of the actuator plate 27 is sufficient to keep the arms 51 down against the cam 56. The movement of the actuator plate along the axis of the shaft 20 is controlled by this cam 56.

The cam shaft 57 also mounts a second cam 66, that is differently shaped from the cam 56, and is used for indexing the unit. As shown, a pair of indexing control arms 67 are pivotably mounted as at 68 to a support 69 attached to the plate 13. The arms 67 are spaced apart and a cam follower roller 70 is rotatably mounted between the arms in position to mate with the cam 66. The arms 67 extend upwardly beyond the roller and at their outer ends a control link or rod 71 is mounted with a pin 72 (see FIG. 6). The link or rod 71 has a rod end 73 with a spherical seat to permit limited movement about this seat. The opposite end of the link or rod 71 is attached with a rod end 74 and a pin to the arm 42. The link 71 can be adjusted by threadably changing the position of the rod end 74 to select the length of this link. A spring 75 is connected to one end of the pin 72, and also to a clip 76 that is fixed to the table top 11 through a suitable bolt. The arm 42 is supported for rotational movement about the axis of the shaft 20 with a slide bracket 77 that is fixed to the table top, and one of the bolts that holds the slide bracket 77 also holds the clip 76 with a spring. Slide bracket 77 is merely a bar that is spaced downwardly from the bottom surface of table top 11 a sufficient distance to permit the arm 42 to slide between the bracket and the table top.

The spring thus urges the arms 67 in direction about their pivot toward the cam 66, and urges the arm 42 to the solid line position shown in FIG. 6. The indexing operation is carried out under the spring force. This is with the hub moved toward the right as shown in FIG. 5. A cam controls pivoting of the arms 67 to set the indexing mechanism the distance equal to the distance shown in FIG. 6 between the ends of the double arrow 78.

The cam shaft 57 is driven when the unit is operating with a motor 80, that drives a gear reducer 82 through a V-belt and pulley arrangement 81, and through a pneumatic clutch 100. The motor 80 can operate all the time, and the machine may be driven only when the clutch is energized. The clutch may be of any usual design and controlled by a suitable valve. The output shaft of the gear reducer operates through a chain or sprocket drive 83 to drive the cam shaft 57.

In addition, the loading and unloading devices for the dial, and other tooling devices can be actuated from the actuator plate 27 as well. As shown, (FIGS. 2, 6 and 7) by way of example a bell crank 86 is connected to suitable supports at the loading station, and operates a slide 87 that can take a work piece, such as a flat slug indicated at 19A, from the loading station and push it onto the processing station holders 19. The bell crank 87 can be actuated by a probe 88 mounted directly on the actuator plate 27.

Another probe 91 can be mounted on the actuator plate on the opposite side thereof (180° opposed) and operate against a lever 92 that in turn controls a probe 93 that enters the work holder 19 at the unloading station, and removes the object or work piece by pushing upwardly and pushing the object off the station so that it will go down the unloading chute 94 at the unloading station. A spring return assembly 95 can be used for the lever 92 to keep the probe normally up until the actuator plate is raised, at which time the probe will be withdrawn while the dial is indexed. Other tooling may be positioned at the other station for further processing of the work piece.

Figure 2:
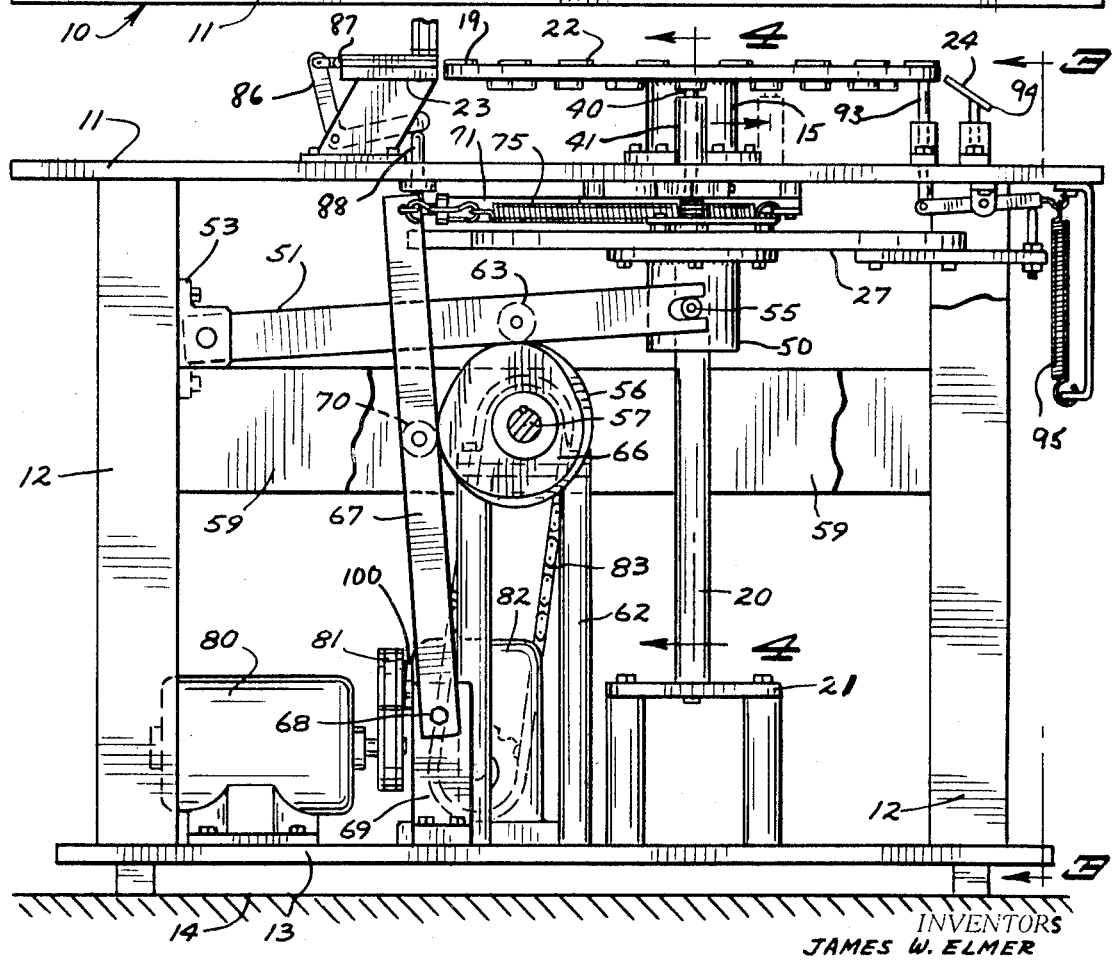
FIG. 2 is a side elevational view of the device in FIG. 1.

In FIG. 2, the unit is shown just before it indexes the dial to a new position. This is the A position shown on the timing diagram of FIG. 10. The hub 41 is in its fully cocked position, and the arms 67 are all the way rearwardly so that the spring 75 is extended to its full amount. The cam 66 (the cam timing line is 66A in FIG. 10) is at the end of its high section. At the same time, the cam 56 (shown by line 56A in FIG. 10) is holding the arms 51 upwardly so that the actuator plate 27 is at its up position. This means, as shown in FIGS. 3 and 4 (FIG. 4 could be either the A or B position), that the shot pin 26 is fully withdrawn from its aligned bushing 22 so that the dial plate 17 can be rotated about the axis of shaft 16 with the indexing pin. The indexing pin is in an aligned bushing 22. As the cam shaft keeps turning the indexing arms move under action of spring 75 to the B position on the timing diagram, and this rotates the dial one station. The B position of the assembly is shown in FIG. 5. Upon further rotation of the cam shaft plate 27 will be lowered, which is shown from the B position in FIG. 10 to the C position. The indexing cam holds in its fully indexed position as shown in FIG. 2, and as indicated by line 66A, and as the actuator plate 27 is lowered, the indexing pin 40 will be pulled out of the bushing 22 with which it is engaged, until it comes to its retracted position as shown in FIG. 8. The shot pin 26 will be urged to move upwardly under the spring pressure of the spring 29, because the lever or rocker arm 33 will be released, so that the shot pin is fully engaged into a bushing 22 on the dial. The pins are timed so that the shot pin engages at a substantially the same time that the indexing pin 40 disengages so that the table is always held solidly near its periphery by either the indexing pin or the shot pin. The shot pin is fully seated, and the indexing pin fully retracted in the C position in FIG. 10. Then from C to D position in FIG. 10 the indexing cam moves to pull the arms 67 against the action of spring 75 so the arm 42 rotates and pin 40 and housing 41 move to the next set position.

As the cam rotates the tooling plate again is moved upwardly under the action of cam 56, indicated by line 56A in FIG. 10 between positions D and A. This inserts the index pin into a bushing 22 and pulls the shot pin out of its bushing. When the tooling plate is up, then the indexing cam would again start to release the arms 67, and as the cams go from A to B position again the dial is again indexed, and the shot pin will have been retracted. Then the arms 67 will be moved against the action of the spring 75 pulling the hub 41 and arm 42 to complete another indexing of the dial.

In order to insure that operation of the machine will be stopped if the shot pin is not seated fully, sensors are used, and a position cam for determining the shot pin position is also utilized. First, the drive to the gear reducer is through a clutch assembly which is illustrated only schematically in FIG. 9 and indicated at 100. This clutch can be an ordinary pneumatically actuated clutch that is controlled by a solenoid valve 101. The valve 101 in turn is controlled from a power source 102. There are two switches for the solenoid valve 101 are coupled so that the solenoid valve 101 will be deenergized if both of the switches are open. This is to insure that the shot pin is holding the indexing dial in the dial's properly indexed position. A first switch 105 is shown in FIG. 9, and also is shown in FIGS. 4 and 8. The switch 105 is positioned to close the valve 101 whenever the collar 32 on shot pin 26 is raised sufficiently to engage the actuator lever of this switch. This is when the shot pin 26 is in a home or dial plate holding position.

A second switch 107 is connected in parallel with the switch 105 to the circuit for valve 101, and this second switch 107 is mounted onto a bracket 108 and has an actuator wheel 109 that is positioned to align with a shot pin monitor cam 110. The cam 110 as shown in FIG. 3, is mounted on the shaft 57 and rotates with the shaft. The cam 110 is timed with respect to the tool plate cam so that during the time when the shot pin should be in it's "home position," or in other words is extending into a receptacle 22, switch 108 is open, and therefore unless the switch 105 is closed, the valve 101 will release the clutch 100, and the drive to cam shaft 57 will stop. This is to insure that the shot pin 26 goes to its home position under its spring load. This movement is monitored to insure that no interference has caused the shot pin to remain in its retracted position.

In FIG. 10, the line 110A shows the monitor cam sequence. Also, in FIG. 9 a view of the cam is shown. Switch 107 is open during the time when the tool plate is moving downwardly, after it has moved downwardly sufficient to release the shot pin, while the tool plate remains down and during the time when the tool plate moves upwardly until the plate has removed the shot pin from its receptacle. This period when switch 107 is actuated is indicated line 110A between the 135° timing line and the 300° timing line in FIG. 10.

However, during the period of time when the shot pin 26 is to be in its receptacle, the cam 110 opens the switch 107 so that the only circuit energizing the solenoid valve 101 has to be through the switch 105. The switch 105 will only be closed if the collar 32 on the shot pin 26 has moved upwardly far enough to contact the actuator for this switch 105. The removal of the shot pin from its aligned receptacle 22 is by mechanical force, so that the monitoring or safety devices do not have to be activated at that time. However the insertion of a shot pin is by spring force, and interference or other problems can cause the pin to hang up, and the switches insure that if the shot pin does hang up the indexing operations will be stopped until the problem is corrected.

The actuator or tool plate thus partially controls the indexing pin movement and controls the shot pin movement. The tool plate 27 forms a tie-in for timing. The cam shaft is the other timing mechanism. Because they are mechanically timed, no interference occurs.

The tool plate movement also provides the motion and force necessary to operate automated operation at the indexing stations on work pieces on the dial plate. This is exemplified by the probes 88 and 91 and associated levers. Of course many other tool operating devices can be used, and the tool plate provides the motion as well as the proper timing for these operations.

What is claimed is:

1. An indexing work table comprising a support, a dial plate member rotatable about a first axis on said support, indexing means to selectively rotate said dial plate to a plurality of indexed positions, and holding means comprising cooperating interlocking projection and receptacle means adjacent the periphery of the dial plate operable to hold said dial plate from rotation subsequent to each indexing operation so that said dial is stable in each indexed position and releasable when the dial plate is to be indexed.

2. The combination as specified in claim 1 wherein said interlocking projection and receptacle means comprises a shot pin mating with a receptacle at each indexed position, and means to interlock a shot pin and a receptacle after each indexing operation and to disengage said pin from the receptacle prior to the next indexing operation.

3. The combination as specified in claim 2 wherein said indexing means comprises an index pin that engages one of said receptacles during the indexing operation, and means to withdraw said index pin subsequent to said indexing operation.

4. The combination as specified in claim 1 and power means comprising a common cam shaft for operating said indexing means and said holding means.

5. The combination as specified in claim 1 wherein said indexing means comprises an indexing pin, means defining a plurality of receptacles evenly spaced adjacent the periphery of said dial plate, first means to move said indexing pin into one of said receptacles, and second means to move said indexing pin in a path causing rotation of said dial plate about its axis a distance to substantially equal the distance between said receptacles, said first means moving said indexing pin into a first receptacle prior to movement of said pin by said second means and withdrawing said pin from said first receptacle subsequent to the movement of said second means.

6. The combination as specified in claim 5 wherein said holding means to hold said dial plate comprises a shot pin movable and into and out of a second receptacle different from said first receptacle, and wherein said first means also moves said shot pin into and out of said second receptacle.

7. The combination as specified in claim 6 wherein said dial plate is rotatably mounted about a substantially upright first axis, and wherein said first means to actuate said indexing pin and shot pin comprises a second plate positioned below said dial plate, means to reciprocate said second plate in direction of the axis of rotation along said first plate to actuate said indexing pin and shot pin.

8. The combination as specified in claim 6 wherein said shot pin is retracted from said second receptacle substantially at the same time that the indexing pin is moved into said first receptacle.

9. The combination as specified in claim 6 and means to retain said shot pin in a retracted position when said indexing pin moves said dial plate about its axis.

10. The combination as specified in claim 7 wherein said second means to move said indexing pin to index said dial plate comprises a spring urging said indexing pin from a first to a second position.

11. The combination as specified in claim 10 and cam means to move said indexing pin against the action of said spring to its second position after said indexing pin has been withdrawn from said first receptacle.

12. The combination as specified in claim 11 wherein said means to move said second plate comprises a second cam means operated substantially simultaneously with said first mentioned cam means said second cam means moving said dial plate to position to withdraw said shot pin and insert said indexing pin into their respective receptacles subsequent to movement of said indexing pin to its second position.

13. The combination as specified in claim 7, means to position work pieces on said dial plate, and tooling means, mounted on the support and operable on work pieces positioned on said plate, said tooling means having means operable to perform operations on work pieces positioned on said plate, and means operably engaged with said second plate for operating said tooling means.

14. The combination as specified in claim 12 and means to sense the position of said shot pin, and means to disable the operation of said cam means when said shot pin is not in proper position.

15. An indexing work table comprising a support and a dial member pivotable about a first axis relative to the support, indexing means to pivot said dial member to a plurality of individual positions, and means comprising interlocking, relatively movable members on the dial member and support respectively independent of said indexing means and movable to a position holding said dial member from pivoting subsequent to each indexing operation and releasing said dial member prior to the next indexing operation so that said dial is held stable in its indexed position.

16. The combination as specified in claim 15 wherein said holding means comprises a reciprocating pin and means defining a plurality of receptacles adjacent the periphery of said dial member, one for each indexed position, said pin entering a receptacle to hold said dial member.

17. The combination as specified in claim 16 and a common cam shaft for operation of said indexing means and reciprocating said pin.

18. The combination as specified in claim 15 wherein said means to actuate said indexing means and said means to hold said dial member comprises a plate, means to reciprocate said plate to actuate said indexing means and said means to hold said dial member at least partially during their cycle of operation.

19. The combination as specified in claim 18 and work pieces mounted on said dial member, tool means to perform work operations on said work pieces actuating means for said tool means, operable from said plate when said plate is reciprocated.

20. An indexing work table comprising a support, a dial plate member rotatably mounted about a first axis on said support, said dial plate member comprising the primary support for work piece on which work operations are performed, indexing means to selectively rotate said dial plate to a plurality of individual positions, and holding means independent of said indexing means to hold the dial plate from turning between indexing operations, said indexing means and said holding means each comprising selectively interlocking pin and receptacle means positioned adjacent the periphery of the dial plate, and control means operable to interlock the pin and receptacle means comprising the indexing means for driving the dial plate and to simultaneously release the pin and receptacle means comprising the holding means during each indexing operation, and then to release the indexing means and engage the holding means.

* * * * *